United States Patent [19]

Sarkar

[11] Patent Number: 4,528,009
[45] Date of Patent: Jul. 9, 1985

[54] METHOD OF FORMING OPTICAL FIBER HAVING LAMINATED CORE

[75] Inventor: Arnab Sarkar, Big Flats, N.Y.

[73] Assignee: Corning Glass Works, Corning, N.Y.

[21] Appl. No.: 500,004

[22] Filed: Jun. 1, 1983

[51] Int. Cl.³ .............................................. C03B 37/01
[52] U.S. Cl. ....................................... 65/3.12; 65/3.2; 65/18.2
[58] Field of Search .................. 65/3.11, 3.12, 3.2, 65/18.2, 18.4; 350/96.33, 96.30

[56] References Cited

U.S. PATENT DOCUMENTS

| | | | |
|---|---|---|---|
| 3,980,459 | 9/1976 | Li | 65/3.12 |
| 3,982,916 | 9/1976 | Miller | 65/3.12 |
| 4,277,272 | 7/1981 | Schneider | 65/3.12 |
| 4,395,270 | 7/1983 | Blankenship et al. | 65/3.11 |
| 4,465,336 | 8/1984 | Huber et al. | 65/3.12 |

FOREIGN PATENT DOCUMENTS

| | | | |
|---|---|---|---|
| 2930781 | 2/1981 | Fed. Rep. of Germany | 65/3.11 |
| 27936 | 2/1982 | Japan | 65/3.11 |

*Primary Examiner*—William Smith
*Assistant Examiner*—Michael K. Boyer
*Attorney, Agent, or Firm*—W. J. Simmons, Jr.

[57] ABSTRACT

A process for manufacturing a preform from which is drawn an optical fiber, the core of which comprises layers of different glass composition. In one embodiment, the known CVD process for making preforms is modified by halting rotation of the substrate tube while the tube is asymmetrically heated by a source that traverses the length of the tube. A vapor mixture flowing through the tube reacts only near that region of the inner surface of the tube that is being heated. This forms a longitudinal strip of glass particles. The flow of reactants stops, the tube is rotated, and it is traversed by heating means which heats the tube to a temperature sufficiently high to fuse the glass particles and forming a longitudinal strip of glassy material.

3 Claims, 12 Drawing Figures

POSITION ON TUBE 10 (DEGREES)

METHOD OF FORMING OPTICAL FIBER HAVING LAMINATED CORE

BACKGROUND OF THE INVENTION

The present invention relates to optical fibers. More particularly, it relates to a method for manufacturing a single-mode optical fiber in which the core is formed of lamina, adjacent ones of which have different characteristics.

In certain applications of single-mode optical waveguide fibers, e.g. gyroscopes, sensors and the like, it is important that the propagating optical signal retain the polarization characteristics of the input light in the presence of external depolarizing perturbations. This requires the fiber to have an azimuthal asymmetry of the refractive index profile. Copending Application Ser. No. 499,898 entitled "Polarization Retaining Single-Mode Optical Waveguide" filed in the name of V. A. Bhagavatula et al. on even date herewith describes a fiber, the core of which is formed of a plurality of laminae of transparent material, adjacent ones of which have different refractive indices. It would be advantageous to form the core of such a fiber by a chemical vapor deposition (CVD) technique so that the fiber is suitable for transmitting optical signals over long distances.

Methods of forming optical fibers having an azimuthal asymmetry of the refractive index profile are disclosed in U.S. Pat. Nos. 3,980,459 (Li) and 3,982,916 (Miller). In accordance with the teachings of both the Li and Miller patents, one or more layers may be formed on the inner surface of a substrate tube by flowing a reactant vapor through the substrate tube and heating the substrate tube and contained vapor mixture with a moving heat source, external to the substrate tube, such that a suspension of glass particles is produced within the substrate tube, the particles traveling downstream and being fused to form a continuous glassy deposit on the inner surface.

In accordance with the teachings of the Li patent at least one longitudinally-extending rod is inserted into the substrate tube, and the vapor-flowing and substrate-heating steps are restarted to resume the production of a glassy deposit, the deposit forming on the glassy deposit previously formed and on the rod. Finally, the vapor-flowing and substrate-heating steps are terminated when the glassy deposit has attained the desired thickness. The resultant preform can be collapsed and drawn into an optical fiber having an azimuthal asymmetry in its refractive index profile. This method is disadvantageous in that it employs as part of the light-propagating portion of the fiber longitudinally extending regions formed by the inserted rods. The boundaries between these longitudinal regions and the remainder of the core are more likely to be the source of imperfections such as seeds than would be the case if the entire core had been formed by chemical vapor deposition within the substrate tube.

The Li patent teaches a further embodiment wherein the longitudinal strip is employed as a baffle to prevent the buildup of one of the core layers. The baffle is removed and the preform is collapsed and drawn into a fiber. This embodiment can also result in imperfections in the core due to damage caused by removing the baffle. Furthermore, the method of forming a preform is made inordinately complicated by rotating a baffle along with the tube during the deposition process and by the need to remove the baffle prior to the collapse step.

The method of the Miller patent departs from the conventional CVD process in that it includes the step of asymmetrically heating the substrate tube to preferentially deposit the doped particulate material on at least one region of the inner surface thereof. The heating of the hollow substrate tube is deliberately made asymmetrical by employing a plurality of oxy-hydrogen jets on one side of the substrate tube and a plurality of cooling jets on the other side thereof. It is stated that the substrate tube is advantageously rotated during the deposition process to minimize deformation of the substrate tube and that both the cooling and the heating jets must be rotated along with the substrate tube. A rather complicated apparatus is required to rotate the air jets and the gas jets in synchronism with the rotation of the substrate tube.

It is therefore an object of the present invention to provide a method forming an optical fiber preform having a core region comprising laminations of glass, adjacent ones of which have different physical characteristics.

SUMMARY OF THE INVENTION

Briefly, the present invention relates to a method of manufacturing a preform which is intended to be subsequently drawn into an optical fiber. This method is of the type that includes the steps of flowing a vapor mixture through a hollow, cylindrical substrate, and heating the substrate and contained vapor mixture with a heat source that moves relative to the substrate in a longitudinal direction, whereby a moving hot zone is established within the substrate, such that glass particles are produced within the hot zone. The particles travel downstream from the hot zone where at least a portion thereof comes to rest on the inner surface of the substrate. In the conventional process, the buildup of particles is fused as the hot zone tranverses the substrate to form a continuous glassy deposit.

In accordance with the improvement of the present invention the substrate tube is held stationary and is nonuniformly heated to a temperature lower than that which causes substantial deformation thereof but sufficiently high to generate within the tube at least one longitudinal region of sufficiently high temperature to cause the vapor mixture to react and generate glass particles adjacent only that portion of the wall that is being heated, a deposit of particles forming along the longitudinal region. The flow of vapor mixture then ceases, and the substrate tube is rotated and heated to a temperature high enough to sinter the glass particles and form at least one longitudinally extending glassy strip within the tube.

To simultaneously form two glassy strips the substrate tube is heated along two diametrically opposed longitudinally extending regions while the substrate tube remains rotationally stationary.

After diametrically opposed, longitudinally-extending glassy strips are formed, a vapor mixture of different composition can be flowed through the tube, and a second pair of glassy strips having a composition different from that of the first pair of strips can be formed over the first pair. After a sufficient number of glassy strips has been formed in this manner, the tube is subjected to an elevated temperature which causes it to collapse. The resultant preform may be directly drawn into an optical fiber, or it may be provided with additional cladding prior to the drawing step.

DESCRIPTION OF THE PREFERRED EMBODIMENT

Figure 1:
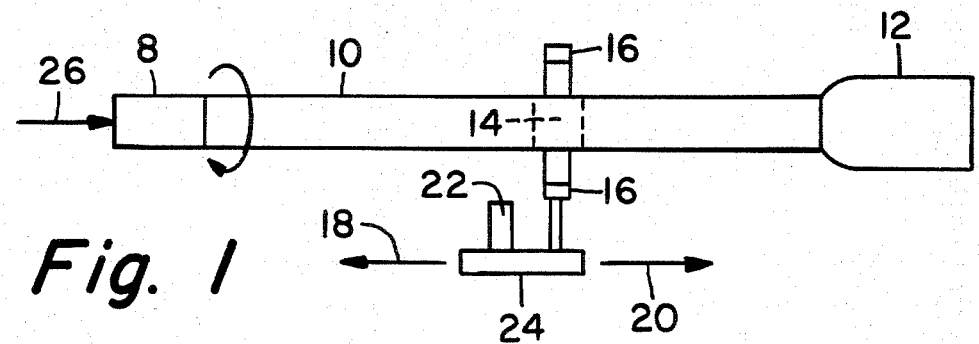
FIG. 1 is a schematic representation of an apparatus for depositing a glass layer within a tube, the apparatus containing modifications to enable it to carry out the method of the present invention.
Figure 2:
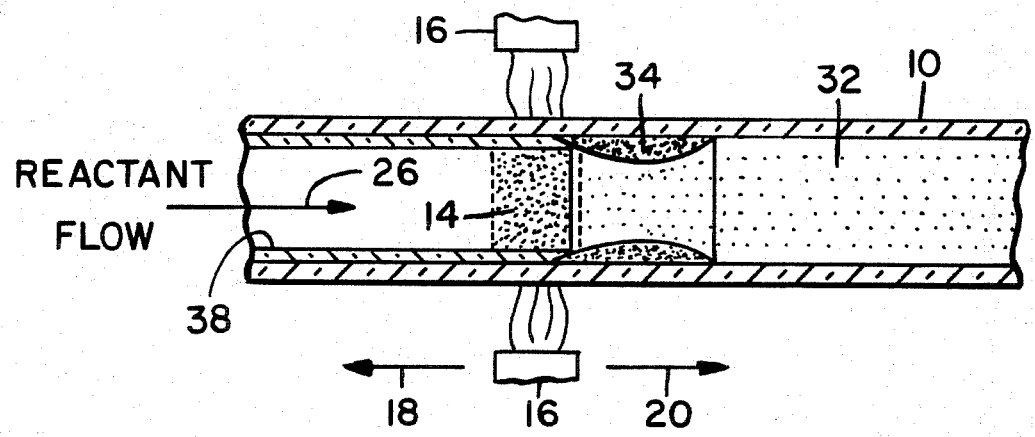
FIG. 2 shows a section of the tube of FIG. 1 depicting observed conditions during processing.

FIGS. 1 and 2 show a CVD system comprising a substrate tube 10 having handle tube 8 affixed to the upstream end thereof and exhaust tube 12 affixed to the downstream end thereof. Tubes 8 and 12 are chucked in a conventional glass turning lathe (not shown), and the combination is rotated as indicated by the arrow. The handle tube, which may be omitted, is an inexpensive glass tube having the same diameter as the substrate tube, and it does not form a part of the resultant optical waveguide. When the above-described apparatus is used in a conventional manner, a hot zone 14 is caused to traverse tube 10 by moving heating means 16 as schematically depicted by arrows 18 and 20. Heating means 16 can consist of any suitable source of heat such as a plurality of burners encircling tube 10. Heating means 16 along with an additional heat source such as burner 22, to be discussed below, are mounted on carriage 24.

As indicated by arrow 26, a vapor mixture is supplied to tube 8. The term "vapor mixture" as used herein includes reactant vapors such as SiCl₄, reactant gases such as oxygen, and inert gases such as argon which may be used as a carrier gas or the like. Suitable means for delivering the vapor mixture to the substrate tube are well known in the art; for an illustration of such means reference is made to U.S. Pat. Nos. 3,826,560, 4,173,305 and 4,188,089.

During operation of the above-described apparatus in a conventional manner, burner 16 initially moves at a low rate of speed relative to tube 10 in the direction of arrow 20, the same direction as the reactant flow. The reactants react in hot zone 14 to produce soot, i.e., finely divided glass particles, which is carried downstream to region 32 of tube 10 by moving gas. As heating means 16 continues to move in the direction of arrow 20, hot zone 14 moves downstream so that a part of soot buildup 34 extends into the hot zone and is consolidated thereby to form a unitary, homogeneous glassy layer 38. Exiting material is exhausted through tube 12. Such process parameters as temperatures, flow rates, reactants and the like can be found in the publications J. B. MacChesney et al., Proceedings of the IEEE, 1280 (1974) and W. G. French et al., Applied Optics, 15 (1976). Reference is also made to the text *Vapor Deposition* Edited by C. F. Powell et al. John Wiley and Sons, Inc. (1966).

When burner 16 reaches the end of tube 10 adjacent to exhaust tube 12, the temperature of the flame is reduced and the burner returns in the direction of arrow 18 to the input end of tube 10. Thereafter, additional layers of glassy material are deposited within tube 10 in the manner described above. This process is conventionally employed to deposit several layers which serve as the cladding and/or core material of the resultant optical waveguide fiber. The temperature of the glass is then increased to about 2200° C. for high silica content glass to cause tube 10 to collapse. This can be accomplished by reducing the rate of traverse of the hot zone. The resultant draw blank is then drawn in accordance with well-known techniques to form an optical waveguide fiber having the desired diameter.

To optimize the process from the standpoint of reaction, high temperatures are utilized during the conventional process. For example, for the usual silica based system, temperatures at the substrate wall are generally maintained between about 1400° and 1900° C. at the moving position corresponding with the hot zone. Indicated temperatures are those measured by a radiation pyrometer focused at the outer tube surface.

Figure 3:
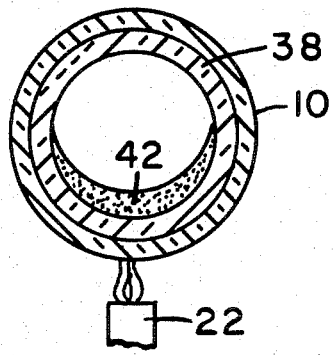
FIG. 3 is a cross-sectional view of an illustrative embodiment of the invention for asymmetrically heating the substrate tube.

In accordance with the present invention one or more azimuthally symmetrical layers may be initially deposited on the inner surface of substrate tube 10 to form regions such as a barrier layer, optical cladding or the like. FIG. 3 shows substrate tube 10 in which barrier layer 38 has been formed as described above. Layer 38 may be formed of pure silica or silica doped with a material such as boric oxide or fluorine.

Figure 4:
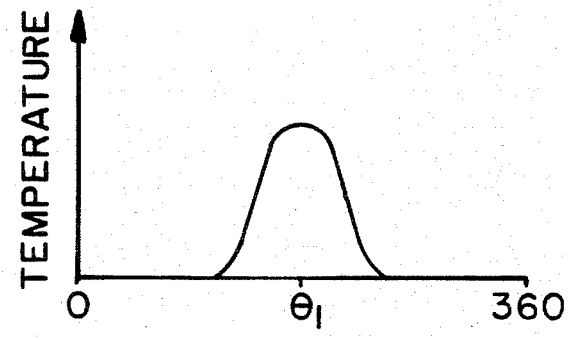
FIG. 4 is a graph illustrating the relative temperature along the circumference of the substrate tube of FIG. 3.

A crescent-shaped layer 43 of soot is then formed on the inner surface of barrier layer 38 in the following manner. Rotation of tube 10 is halted, and burner 16 is turned off. The composition of vapor mixture 26 is adjusted so that it will react to form glass particles having a suitable composition for forming one of the core layers, as will be hereinafter described. Burner 22 emits a flame toward one side of tube 10 to generate along the circumference thereof an azimuthal temperature profile of the type illustrated in FIG. 4. Position θ₁ along the abscissa of FIG. 4 is located along the burner axis, i.e. the hottest region of the flame. As carriage 24 traverses longitudinally along tube 10 in the direction of arrow 20, burner 22 heats the tube to a temperature lower than that which would cause substantial deformation thereof so that tube 10 does not sag or deform while it remains stationary. The peak temperature generated within tube 10 is sufficient to cause reaction of only that portion of the vapor mixture flowing through tube 10 near the region of the wall heated by the burner. The thermophoresis effect causes the resultant soot to deposit and form a buildup downstream of burner 22.

Figure 5:
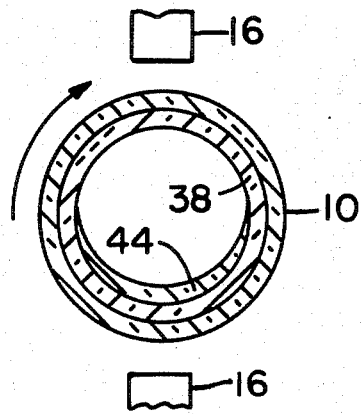
FIG. 5 is another cross-sectional view of the preform shown in FIG. 4 being symmetrically heated to fuse the soot deposit therein.

After burner 22 has traversed the length of tube 10, a longitudinally-extending buildup of soot exists along that region of the tube which has been heated by the burner, since the heat from that burner is insufficient to fuse or sinter the soot layer 42. Thereafter, tube 10 is rotated as indicated by the arrow in FIG. 5, and the flow of reactants is stopped. Heating means 16 is activated and traverses the length of tube 10 to fuse the soot buildup and form a longitudinally extending, cresent-shaped glassy layer 44 on the inner surface of barrier layer 38. Soot layer 42 can be sintered by the heat from burner 16 while the carriage returns in direction 18, or a separate pass of burner 16 in direction 20 may be employed to accomplish sintering.

Figure 6:
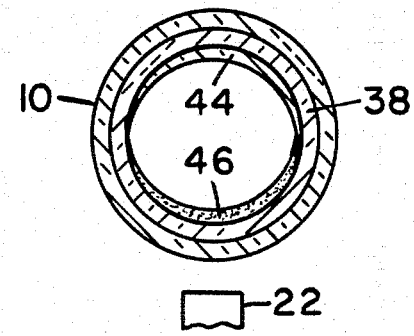
FIGS. 6 and 7 are further cross-sectional views of the preform of FIG. 5 illustrating the formation and consolidation of an additional asymmetric, longitudinally extending soot deposit.
Figure 7:
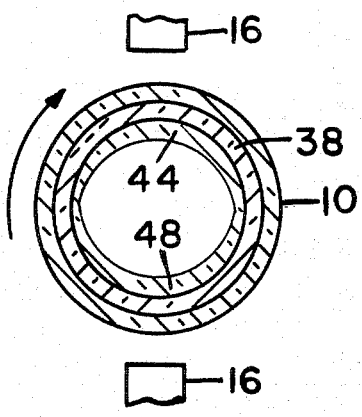

Tube 10 is then oriented so that the axis of burner 22 is aligned with the 0° azimuthal position thereof, a position which is 180° from the location of the burner axis during deposition of soot layer 42. The flow of vapor mixture 26 is again started, the composition thereof being the same as it was during the deposition of soot layer 42. Burner 22 again traverses the length of tube 10 to cause the formation of a longitudinally extending cresent-shaped layer 46 as shown in FIG. 6. FIG. 7 illustrates the rotation of tube 10 in the absence of flow of vapor mixture while heating means 16 traverses the length of the tube to fuse the soot buildup and form glassy layer 48, the composition of which is identical to that of layer 44.

Figure 8:
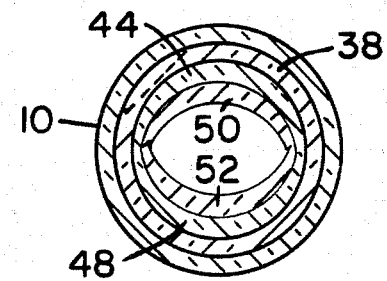
FIG. 8 is a cross-sectional view of a preform containing additional glassy layers.

The composition of the vapor mixture can be changed and glassy layers 50 and 52 of FIG. 8 can be deposited in a manner similar to that discussed in connection with FIGS. 3 through 7. For example, the composition of layers 50 and 52 may be such that the refractive index thereof is lower or higher than that of layers 44 and 48. Additional layers of high and low refractive index glass may be sequentially deposited on layers 50 and 52 until the desired core structure is formed. The sequentially deposited crescent-shaped layers produce a composite thickness such that oppositely disposed strips are greater at the opposite sites of the tube to which the strips were applied than at regions of the strips that are orthogonal to the opposite sides. It is noted that the thicknesses of layers 44, 48, 50 and 52 are greatly exaggerated with respect to the thickness and diameter of tube 10, and that many layers of core glass could be deposited by practicing the method of the present invention.

Figure 9:
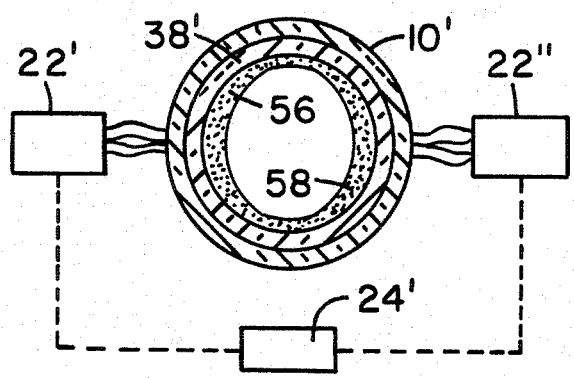
FIG. 9 is a cross-sectional view of another embodiment of the invention for asymmetrically heating a preform along diametrically opposed longitudinally-extending regions.
Figure 10:
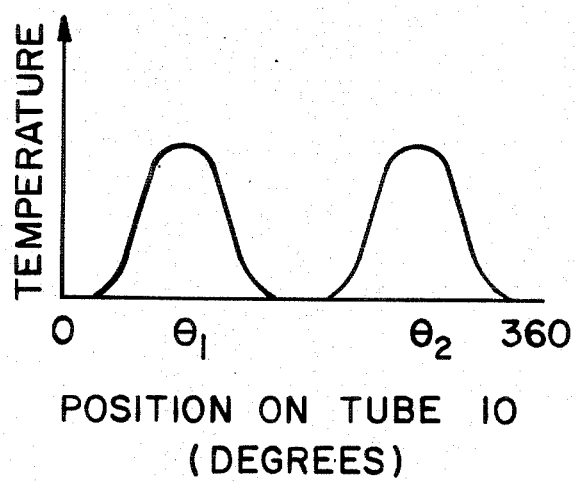
FIG. 10 is a graph illustrating the relative temperature of the circumference of the tube of FIG. 9.

A modification of the previously described embodiment is illustrated in FIG. 9 wherein elements similar to those shown in FIGS. 1, 3 and 6 are represented by primed reference numerals. Two burners 22' and 22" are located at diametrically opposed regions of substrate tube 10'. Burners 22' and 22" are mechanically connected to carriage 24' as indicated by the dashed lines. After barrier layer 38' is formed in a conventional manner, rotation of tube 10' is halted, and burner means 16 of FIG. 1 is turned off. Burners 22' and 22" emit flames toward diametrically opposed regions of tube 10' to generate along the circumference thereof an azimuthal temperature profile of the type illustrated in FIG. 10. Positions $\theta_1$ and $\theta_2$ along the abscissa of FIG. 10 indicate that points of maximum heating of the circumference of tube 10 are separated by 180°. Burners 22' and 22" function in a manner similar to burner 22 in that they heat substrate tube 10' to a temperature that is sufficiently low that there is substantially no deformation of non-rotating tube 10'. However, burners 22' and 22" generate within tube 10' hot zones adjacent the tube wall which cause reaction of only those portions of the vapor mixture flowing through tube 10' near the regions of the wall heated by those burners. As burners 22' and 22" traverse the length of tube 10' oppositely disposed cresent-shaped soot layers 56 and 58 are simultaneously formed on the inner surface of barrier layer 38'. In a manner similar to that described in connection with FIG. 5, vapor mixture flow is stopped and tube 10' rotates while heating means 16 traverses the length thereof to fuse soot layers 56 and 58 to form diametrically opposed glassy layers. As described in connection with FIG. 8, additional glassy layers of differing refractive index can be built up upon the glassy layers formed by fusing soot layers 56 and 58. The embodiment of FIG. 9 is advantageous in that it makes more efficient use of the vapor mixture and in that it enables the formation of a preform in less time than would be required with the embodiment of FIG. 3 since soot layers 56 and 58 are simultaneously formed.

After the desired number of cresent-shaped glassy layers are deposited within the substrate tube, heating means 16 traverses the rotating substrate tube at a reduced traverse rate, thereby increasing the temperature. For high silica content substrate tubes, the temperature at the outer surface thereof increases to about 2200° C. This causes the collapse of the substrate tube into an optical fiber preform having a solid cross-section. The substrate tube can be collapsed into an elliptically-shaped preform by nonuniformly heating it so that the highest temperature is generated along those diametrically opposed longitudinal regions thereof upon which the glass strips have been built up. Methods of forming elliptically-shaped preforms from coated substrate tubes are disclosed in U.S. Pat. Nos. 4,184,859 and 4,360,371.

The resulting preform or blank is then heated to a temperature at which the materials thereof have a low enough viscosity for drawing. High silica content preforms are heated to approximately 2000° C. This structure can then be drawn to the final fiber diameter. Alternatively, the collapsed preform can be provided with additional cladding material in accordance with well known techniques before being drawn to the final fiber diameter. Additional cladding may be added by a flame oxidation process as taught in U.S. Pat. No. 3,775,075, or the consolidated preform may be inserted into a tube of cladding material, the composite being drawn into an optical fiber. If additional cladding material is to be provided, the collapsed preform can first be drawn into an intermediate, large diameter fiber which is thereafter provided with additional cladding.

Figure 11:
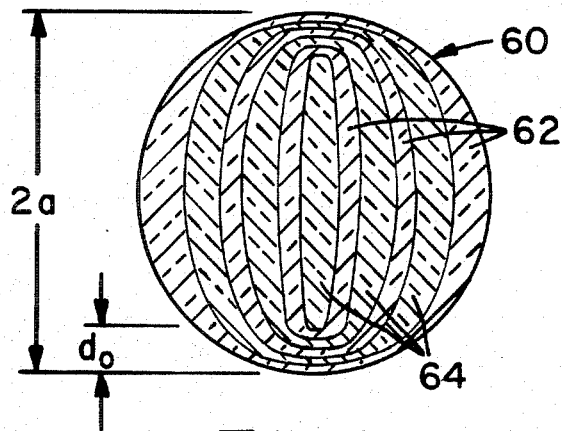
FIG. 11 is a cross-sectional view of the core region of an optical fiber formed by the method of the present invention.

FIG. 11 is a cross-sectional view of the core portion of an optical fiber formed in accordance with the method of the present invention. Core 60 is formed of alternate layers 62 and 64 of glass having different refractive index. The thicknesses of layers 62 and 64 must be less than the wavelength of light to propagated through the fiber for the fiber to have the beneficial polarization retention properties described in the aforementioned Bhagavatula et al. application.

Figure 12:
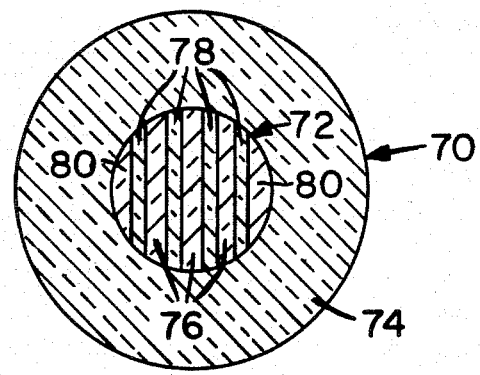
FIG. 12 is a cross-sectional view of a single-polarization single-mode optical fiber having a laminated core.

For comparison purposes one of the fiber structures taught in the aforementioned Bhagavatula et al. application is illustrated in FIG. 12. The ratio of the core diameter to the overall fiber diameter is exaggerated in order to more clearly indicate the structure of the core. Single polarization single-mode fiber 70 comprises a core porton 72 surrounded by a layer of cladding material 74. Core 72 is formed of a plurality of transparent lamina 76, adjacent ones of which are separated by transparent lamina 78, the refractive index of which is different from that of lamina 76. Regions 80 at the opposite sides of the core may be formed of a transparent material having a very low refractive index, or they may be formed of the same material as lamina 76. Lamina 76 and 78 are of substantially uniform thickness throughout the length thereof, and they extend to the cladding material. As mentioned previously, the thicknesses of slabs 76 and 78 are less than the wavelength of the light to be propagated through the fiber.

As shown in FIG. 11, the central region 64 of the core does not quite extend to the cladding material, a distance $d_0$ separating the ends of central region 64 and the edge of core 60. If the distance $d_0$ is significantly smaller than the core diameter $2a$, the core structure of FIG. 11 will adequately approximate the proposed design of FIG. 12 and therefore result in a single polarization, single-mode optical fiber. Furthermore, the core may be eliptical instead of being perfectly circular. Indeed, the method of the present invention tends to result in the formation of an elliptically-shaped core.

I claim:

1. In the method of manufacturing an optical fiber preform which includes the steps of passing through a rotating substrate tube a vapor mixture which, when heated, forms glass particles, moving a heat source along the outside of said tube whereby at least a portion of said vapor mixture is converted to glass particles and at least a portion of said glass particles is deposited on the inside of said tube, and collapsing the resultant structure to form an aperture-free optical fiber preform, the improvement which comprises halting rotation of said tube, nonuniformly heating said stationary tube to a first temperature which is lower than that which causes substantial deformation thereof but sufficiently high to generate within said tube at least one longitudinal region of sufficiently high temperature to cause the reaction of a first vapor mixture and the generation of glass particles only adjacent that portion of said tube that is being heated, at least a first deposit of particles thereby forming along said at least one longitudinal region, rotating said substrate tube, stopping the flow of vapor mixture, heating said rotating substrate tube to a second temperature which is high enough to sinter said glass particles and form at least one longitudinal glassy strip within said tube, continuing the steps of halting rotation, nonuniformly heating, rotating, stopping the flow, and heating to thereby build up on opposite sides of the inner surface of said substrate tube a plurality of glassy strips, the composition of said vapor mixture being different during the deposition of adjacent glassy strips whereby the refractive index of each glassy strip differs from that of the adjacent glassy strip, the composite thicknesses of all of said oppositely disposed strips being greater at said opposite sides of said tube to which said strips are applied than at regions of said strips that are orthogonal to said opposite sides, and applying to those diametrically opposed regions of said substrate upon which said glassy strips have been formed a sufficient amount of heat to cause said substrate tube to collapse flat and form an elliptically-shaped preform in which said glassy strips form substantially parallel layers.

2. A method in accordance with claim 1 wherein the step of nonuniformly heating said tube comprises heating opposite sides of said tube to said first temperature, thereby forming diametrically opposed, longitudinally extending deposits of glass particles, the step of heating simultaneously sintering said deposits to form said at least one longitudinal glassy strip and a diametrically opposed second longitudinal glassy strip within said tube.

3. A method in accordance with claim 1 wherein the step of nonuniformly heating said tube comprises heating only one side of said tube, thereby resulting in the formation of a single longitudinal glassy strip within said tube, each subsequent step of nonuniformly heating said stationary tube comprising nonuniformly heating that side of said tube opposite the side that had been previously heated.

* * * * *